(12) United States Patent
Li et al.

(10) Patent No.: US 11,960,197 B2
(45) Date of Patent: Apr. 16, 2024

(54) DYNAMIC PROJECTION SYSTEM SUITABLE FOR AUTOMOBILE

(71) Applicant: CHENGDU PULSE OPTICAL CO., LTD., Chengdu (CN)

(72) Inventors: Yang Li, Chengdu (CN); Yunxia Yue, Chengdu (CN); Tingting Jiang, Chengdu (CN); Qian Li, Chengdu (CN)

(73) Assignee: CHENGDU PULSE OPTICAL CO., LTD., Chengdu (CN)

( * ) Notice: Subject to any disclaimer, the term of this patent is extended or adjusted under 35 U.S.C. 154(b) by 0 days.

(21) Appl. No.: 17/970,413

(22) Filed: Oct. 20, 2022

(65) Prior Publication Data
US 2023/0127660 A1 Apr. 27, 2023

(51) Int. Cl.
*G03B 21/20* (2006.01)
*G03B 21/00* (2006.01)

(52) U.S. Cl.
CPC ....... *G03B 21/2073* (2013.01); *G03B 21/006* (2013.01); *G03B 21/208* (2013.01)

(58) Field of Classification Search
CPC . G03B 21/2073; G03B 21/006; G03B 21/208
USPC .......................................... 353/13
See application file for complete search history.

(56) References Cited

U.S. PATENT DOCUMENTS

2015/0234197 A1* 8/2015 Ushigome ............ G02B 27/283
353/20

FOREIGN PATENT DOCUMENTS

CN 113366387 A * 9/2021 ............... G02B 5/30

OTHER PUBLICATIONS

Translationof113366387 (Year: 2023).*

\* cited by examiner

*Primary Examiner* — Jerry L Brooks
(74) *Attorney, Agent, or Firm* — CRGO Global; Steven M. Greenberg

(57) ABSTRACT

Provided is a dynamic projection system suitable for an automobile. The system includes a light source, a collimating lens, a first microlens array, an LCD projection source and a second microlens array, wherein the dynamic projection system further comprises a polarization grating used for separating P-polarized light and S-polarized light, and a wave plate array. The wave plate array includes a plurality of ½ wave plates arranged at intervals. The polarization grating is arranged in front of the first microlens array and the second microlens array, the ½ wave plates and the LCD projection source are arranged between the first microlens array and the second microlens array, and the ½ wave plates are arranged in front of the LCD projection source to play a role in converting one of the P-polarized light and the S-polarized light into the other one of the P-polarized light and the S-polarized light.

5 Claims, 2 Drawing Sheets

- - - - - - - Non-polarized light
——————— S-polarized light
- - - - - - - - - P-polarized light

DYNAMIC PROJECTION SYSTEM SUITABLE FOR AUTOMOBILE

CROSS REFERENCE TO RELATED APPLICATIONS

This application claims priority under 35 U.S.C. § 119(a) to Chinese patent application 202111228694.0 filed on Oct. 21, 2021, the entire teachings of which are incorporated herein by reference.

BACKGROUND OF THE INVENTION

Field of the Invention

The present disclosure relates to the technical field of dynamic projection, and specifically relates to a dynamic projection system suitable for an automobile.

Description of the Related Art

At present, a projection system, as shown in FIG. 1, mostly comprises a light source 1, a collimating lens 2, a microlens array 3 and a projection source. Light emitted by the light source 1 is firstly collimated by the collimating lens 2 and then reaches the first microlens array 3 and the second microlens array 10. The first microlens array 3 and the second microlens array 10 have curvatures and surface types which are the same in values but opposite in directions. At the same time, both the first microlens array 3 and the second microlens array 10 may also be integral.

Each sub-lens of the first microlens array 3 and the second microlens array 10 forms an optical channel. The optical channel is used for dividing incident light into a plurality of sub-light beams. Each sub-light beam passes through the corresponding optical channel. Light of a specific part penetrates through the projection source, and simultaneously, incident light of other parts is blocked to form a needed projection pattern. The projection source typically has several projection patterns, and each optical channel corresponds to one projection pattern.

The light-transmitting structure of the projection source can be realized through printing, coating, photoetching and other technologies. The light-transmitting structure may be in the form of a separate element (such as a projection film) or attached to the first microlens array 3 and the second microlens array 10 (for example, the light-transmitting structure is coated or printed on the surfaces of the first microlens array 3 and the second microlens array 10 or engraved on the non-optical surfaces of the first microlens array 3 and the second microlens array 10). After all the sub-light beams pass through the first microlens array 3, the second microlens array 10 and the projection source, overlapping is achieved at a certain distance, a final projection pattern 5 is formed, and the pattern 5 is formed by overlapping all the sub-projection patterns on the projection source.

Most of projection sources of an existing projection system are achieved through printing, film coating, photoetching and other technologies, and through the technologies, the projection pattern can not be changed once a projection pattern is formed, namely, the projection pattern is determined after a product is packaged and a dynamic effect can not be projected. Therefore, at present, a liquid crystal display (LCD) is usually adopted as the projection source, namely an LCD projection source 4.

However, the LCD achieves the effect of shielding other light rays while specific light rays can pass through the LCD by adjusting the polarization of the incident light. According to the relative relation between the electric field direction of the light and the propagation plane of the light, the polarization of the light can be divided into P polarization and S polarization. The polarization direction difference between the P polarization and the S polarization is 90 degrees, and the light with only one polarization is called as linearly polarized light. The light emitted by the natural world and most light sources is unpolarized light. That is to say, the light contains polarization in two directions at the same time, and the ratio of the polarization in two directions is about 50%.

The LCD is composed of two polarizing films and one liquid crystal layer between the two polarizing films. When the unpolarized light reaches the LCD, the first polarizing film can completely filter out one of the polarized light, the liquid crystal layer of the LCD modulates the filtered linearly polarized light, and then the liquid crystal layer of the LCD and the second polarizing film determine the light required to pass through the LCD and be shielded. Therefore, a high-resolution projection effect is achieved.

One of the polarized light is completely filtered out by the first polarized light of the LCD, and about 50% of the light emitted from the light source will be lost. Therefore, the optical efficiency of the system is severely reduced, so that the brightness of the projected content does not be matched with the ability of the used light source. In addition, the polarizing film realizes a filtering effect by absorbing the polarized light in a specific polarization direction, and the absorbed light is converted into heat energy to increase the temperature of the LCD, so that a great influence on the service life and the modulation effect of the LCD is achieved.

BRIEF SUMMARY OF THE INVENTION

The present disclosure aims to provide a dynamic projection system suitable for an automobile. The optical efficiency is improved, the heat generated by the optical system at the LCD is reduced, the influence on the LCD due to the overheating of the system is avoided, and the stability of the system is improved.

The embodiments of the present disclosure are realized through the following technical scheme.

A dynamic projection system suitable for an automobile comprises a light source, a collimating lens, a first microlens array, an LCD projection source and a second microlens array, wherein the dynamic projection system further comprises a polarization grating used for separating P-polarized light and S-polarized light, and a wave plate array, and the wave plate array comprises a plurality of ½ wave plates arranged at intervals; and the polarization grating is arranged in front of the first microlens array and the second microlens array, the ½ wave plates and the LCD projection source are arranged between the first microlens array and the second microlens array, and the ½ wave plates are arranged in front of the LCD projection source to play a role in converting one of the P-polarized light and the S-polarized light into the other one of the P-polarized light and the S-polarized light.

Optionally, a conversion wave plate is further arranged between the polarization grating and the first microlens array.

Optionally, the first microlens array and the second microlens array each comprise a plurality of sub-lenses, and the sub-lenses comprise one or more of plano-convex lenses, biconvex lenses and meniscus lenses.

A dynamic projection system suitable for an automobile comprises a light source, a collimating lens, a first microlens array, an LCD projection source and a second microlens array, wherein the dynamic projection system further comprises a polarization grating used for separating P-polarized light and S-polarized light, a condensing lens and a wave plate array, and the wave plate array comprises a plurality of ½ wave plates arranged at intervals; and the polarization grating is arranged in front of the first microlens array and the second microlens array, the ½ wave plates and the LCD projection source are arranged between the first microlens array and the second microlens array to play a role in converting one of the P-polarized light and the S-polarized light into the other one of the P-polarized light and the S-polarized light, and the LCD projection source and the condensing lens are sequentially arranged at the back of the second microlens array.

Optionally, a conversion wave plate is further arranged between the polarization grating and the first microlens array.

Optionally, the first microlens array and the second microlens array each comprise a plurality of sub-lenses, and the sub-lenses comprise one or more of plano-convex lenses, biconvex lenses and meniscus lenses.

Optionally, the condensing lens is a plano-convex lens, a biconvex lens or a meniscus lens.

The dynamic projection system at least has the following advantages and beneficial effects: the polarization grating can separate the P-polarized light and the S-polarized light in the light source, and the first microlens array focuses one of the P-polarized light and the S-polarized light, which cannot pass through polarizing films of the LCD, onto the wave plate array; the polarized light is converted into another polarized light which can pass through the polarizing films of the LCD through the ½ wave plates, so that the light energy loss is greatly reduced, and the optical utilization rate is improved; and meanwhile, light energy filtered by polarization absorption of the LCD is greatly reduced, heat generated by the optical system at the LCD is reduced, the influence on the LCD due to the overheating of the system is avoided, and the stability of the system is improved.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiment I

Figure 1:
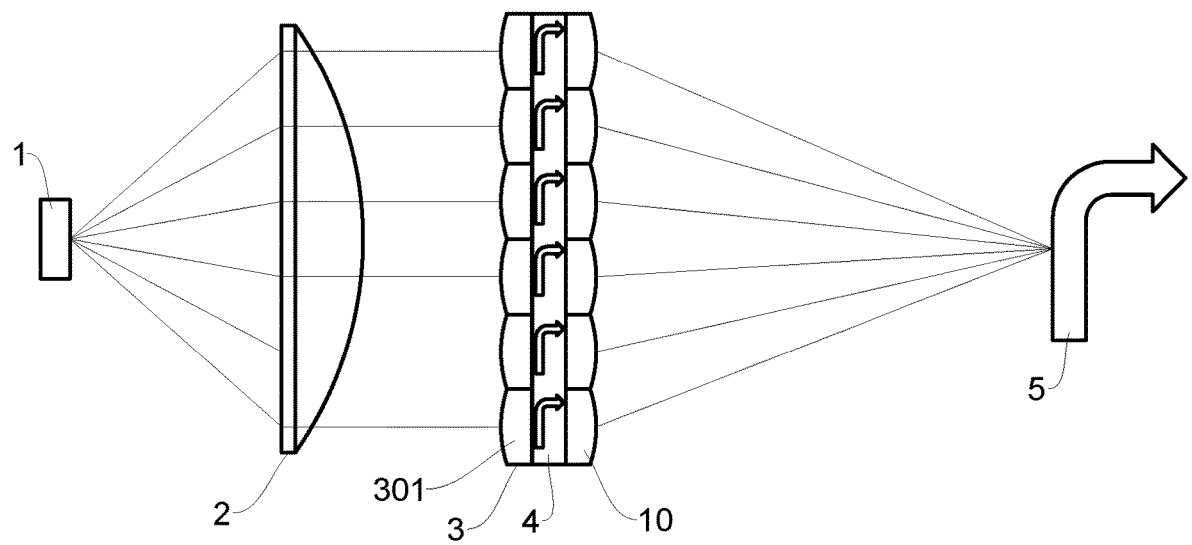
FIG. 1 is a structural schematic diagram of a dynamic projection system in the prior art.
Figure 2:
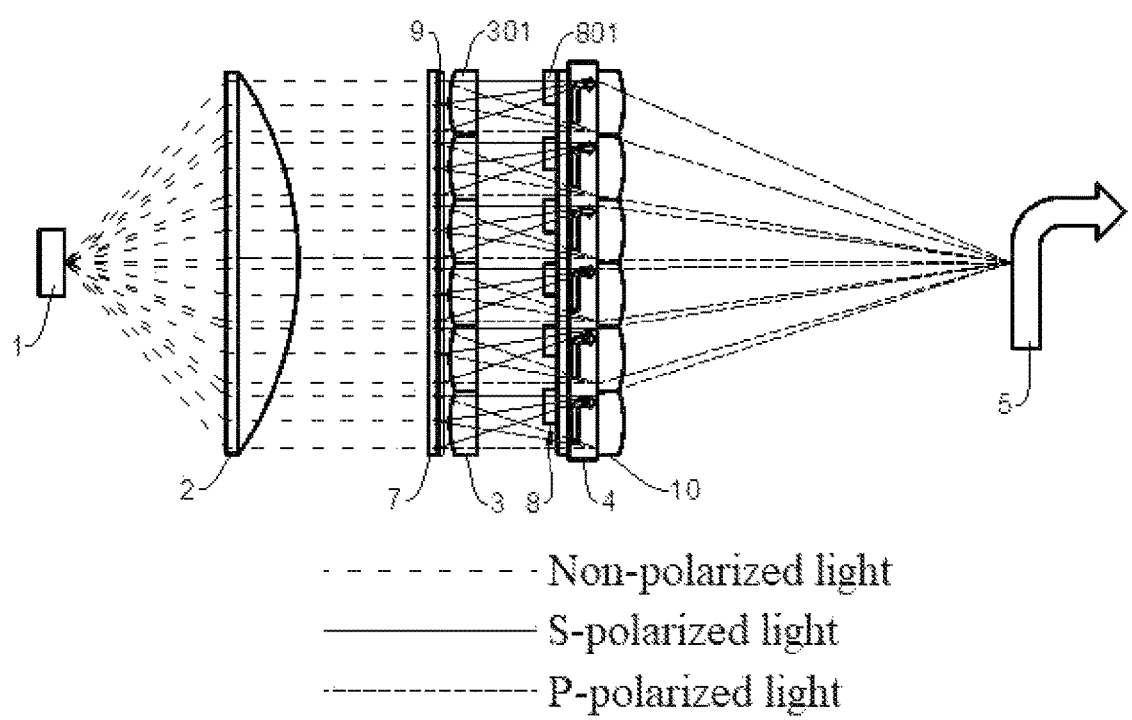
FIG. 2 is a structural schematic diagram of a dynamic projection system suitable for an automobile provided by the first embodiment.

As shown in FIG. 2, a dynamic projection system suitable for an automobile comprises a light source 1, a collimating lens 2, a first microlens array 3, an LCD projection source 4 and a second microlens array 10, wherein the first microlens array 3 and the second microlens array 10 each comprise a plurality of sub-lenses 301, and the sub-lenses 301 comprise one or more of plano-convex lenses, biconvex lenses and meniscus lenses.

The dynamic projection system further comprises a polarization grating 7 used for separating P-polarized light and S-polarized light, and a wave plate array 8, and the wave plate array 8 comprises a plurality of ½ wave plates 801 arranged at intervals. It is easy to understand that the number of the ½ wave plates 801 should be the same as the number of the sub-lenses 301 of the first microlens array 3 and the second microlens array 10. The polarization grating 7 is arranged in front of the first microlens array 3 and the second microlens array 4, the ½ wave plates 801 and the LCD projection source 4 are arranged between the first microlens array 3 and the second microlens array 10, and the ½ wave plates 801 are arranged in front of the LCD projection source 4 to play a role in converting one of the P-polarized light and the S-polarized light into the other one of the P-polarized light and the S-polarized light.

When the system is used, light is emitted from the light source 1 and passes through the polarization grating 7 after being collimated by the collimating lens 2. The polarization grating 7 is a polarization-state-based selective light diffraction device and is used for realizing selective light splitting according to the polarization state of incident light. After the unpolarized light passes through the polarization grating 7, the S-polarized light and the P-polarized light contained in the unpolarized light are separated at a certain angle relative to the incident light, and the separation angle depends on the number of grating lines of the polarization grating 7.

The first microlens array 3 focuses the separated P-polarized light and S-polarized light to different positions. One of the polarized light is focused to the ½ wave plates 801 on the wave plate array 8. For example, in the embodiment, the separated S-polarized light is focused to the ½ wave plates 801 and converted into P-polarized light capable of passing through polarizing films of the LCD. The separated P-polarized light is focused between intervals of the ½ wave plates (namely, the separated P-polarized light does not pass through the ½ wave plates 801). Finally, the separated P-polarized light and the converted P-polarized light pass through the LCD projection source 4 and the second microlens array 10 to form a final projected image 5.

Compared with the prior art, due to the fact that the ½ wave plates 801 convert one of polarized light incapable of passing through the polarizing films of the LCD into polarized light capable of passing through the polarizing films of the LCD, the light energy loss is greatly reduced, and the optical utilization rate is improved. Meanwhile, light energy filtered by polarization absorption of the LCD is greatly reduced, heat generated by the optical system at the LCD is reduced, the influence on the LCD due to the overheating of the system is avoided, and the stability of the system is improved.

In the embodiment, a conversion wave plate 9 is further arranged between the polarization grating 7 and the first microlens array 3. The specific degree of the polarization deflection of the incident light is matched with the polarization grating 7 so that incident non-polarized light can be better converted into the polarization direction matched with the LCD.

Moreover, it should be noted that after the polarization grating 7 is used (or the polarization grating 7 is matched with the conversion wave plate 9) for separating the incident non-polarized light into the P-polarized light and the S-polarized light, a certain included angle exists between the two kinds of linearly polarized light and a certain area exists in the polarization grating, and therefore, the etendue of the emergent light is increased (the etendue is a physical quantity related to area and divergence angle, which is only maintained or increased in the optical system, and the light energy is lost once the etendue is decreased). If the emergent light is collected by a general optical element at that time, the optical system becomes relatively large.

Through cooperation of the first microlens array 3 and the second microlens array 10, under the condition that the etendue passing through the polarization grating 7 is not reduced (namely, the luminous efficacy is not reduced), two kinds of divergent polarized light are collected and converted into single linearly polarized light to participate in final projection.

Figure 3:
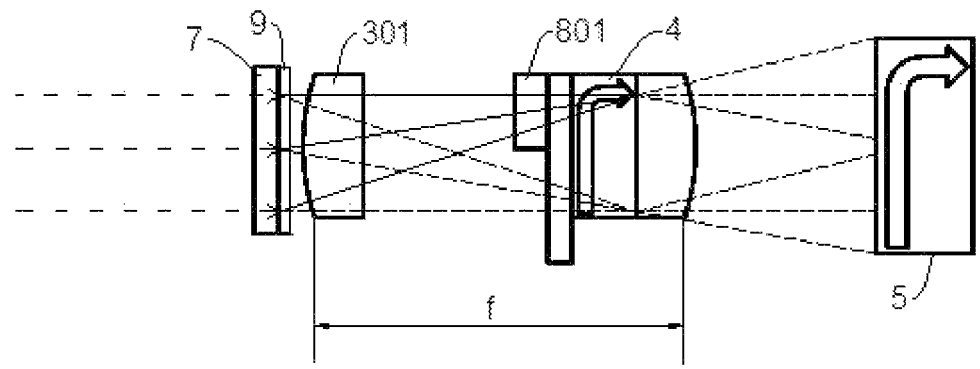
FIG. 3 is a schematic diagram of a light path corresponding to a single sub-lens 301 in the first embodiment.

FIG. 3 indicates a schematic diagram of a light path corresponding to a single light channel, namely a single sublens 301, of the system. Wherein, the distance between the two sub-lenses 301 is about the focal length f of the sub-lenses 301, and the beam splitting point of the beam splitting light after passing through the polarization grating 7 (or the polarization grating 7 and the conversion wave plate 9) is near the optical surface of the first sub-lenses 301. At the moment, the divergent light passes through the first sub-lenses 301 through the focal length f and passes through the corresponding second sub-lens 301, and then is collimated. Therefore, the image of the unit is imaged at the distance needing to be projected.

The ½ wave plates 801 need to be placed between the two sub-lenses 301, and specifically, the two kinds of polarized light after passing through the first sub-lenses 301 are completely separated (as shown in FIG. 3). After the non-polarized light is converted into the P-polarized light and the S-polarized light in the mode, the size of the whole projection system can still be kept compact, and various conditions for installing projection lamps in narrow spaces are met.

Embodiment II

Figure 4:
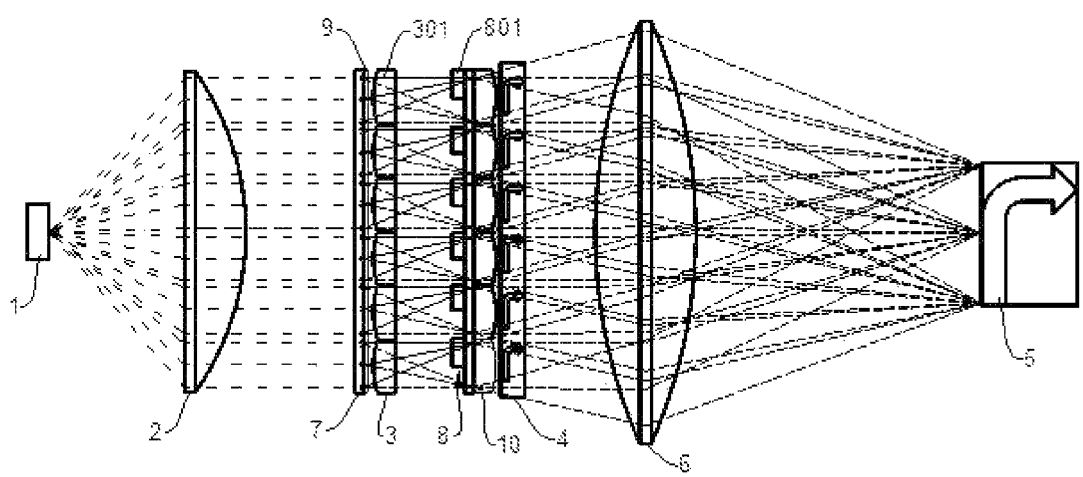
FIG. 4 is a structural schematic diagram of a dynamic projection system suitable for an automobile provided by the second embodiment.

As shown in FIG. 4, a dynamic projection system suitable for an automobile comprises a light source 1, a collimating lens 2, a first microlens array 3, an LCD projection source 4 and a second microlens array 10, wherein the first microlens array 3 and the second microlens array 10 each comprise a plurality of sub-lenses 301, and the sub-lenses 301 comprise one or more of plano-convex lenses, biconvex lenses and meniscus lenses.

The dynamic projection system further comprises a polarization grating 7 used for separating P-polarized light and S-polarized light, a condensing lens 6 and a wave plate array 8, and the wave plate array 8 comprises a plurality of ½ wave plates 801 arranged at intervals; and the polarization grating 7 is arranged in front of the first microlens array 3 and the second microlens array 10, the ½ wave plates 801 are arranged between the first microlens array 3 and the second microlens array 10 to play a role in converting one of the P-polarized light and the S-polarized light into the other one of the P-polarized light and the S-polarized light, and the LCD projection source 4 and the condensing lens 6 are sequentially arranged at the back of the second microlens lens 10.

When the system is used, light is emitted from the light source 1 and passes through the polarization grating 7 after being collimated by the collimating lens 2. The polarization grating 7, the same as that in the first embodiment, is a polarization-state-based selective light diffraction device and is used for realizing selective light splitting according to the polarization state of incident light. After the unpolarized light passes through the polarization grating 7, the S-polarized light and the P-polarized light contained in the unpolarized light are separated at a certain angle relative to the incident light, and the separation angle depends on the number of grating lines of the polarization grating 7.

The first microlens array 3 focuses the separated P-polarized light and S-polarized light to different positions. One of the polarized light is focused to the ½ wave plates 801 on the wave plate array 8. For example, in the embodiment, the separated S-polarized light is focused to the ½ wave plates 801 and converted into P-polarized light capable of passing through polarizing films of the LCD. The separated P-polarized light is focused between intervals of the ½ wave plates (that is, the separated P-polarized light does not pass through the ½ wave plates 801). Finally, the separated P-polarized light and the converted P-polarized light pass through the second microlens array 10, the LCD projection source 4 and the condensing lens 6 to form a final projected image 5. The condensing lens 6 is a plano-convex lens, a biconvex lens or a meniscus lens to play a role in focusing.

Similarly, compared with the prior art, due to the fact that the ½ wave plates 801 convert one of polarized light incapable of passing through the polarizing films of the LCD into polarized light capable of passing through the polarizing films of the LCD, the light energy loss is greatly reduced, and the optical utilization rate is improved. Meanwhile, light energy filtered by polarization absorption of the LCD is greatly reduced, heat generated by the optical system at the LCD is reduced, the influence on the LCD due to the overheating of the system is avoided, and the stability of the system is improved.

The embodiment is the same as the first embodiment. A conversion wave plate 9 is further arranged between the polarization grating 7 and the first microlens array 3. The specific degree of the polarization deflection of the incident light is matched with the polarization grating 7 so that incident non-polarized light can be better converted into the polarization direction matched with the LCD.

The principle of a light path corresponding to a single sub-lens 301 in the embodiment is similar to that in the first embodiment and is not described again here.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

What is claimed is:

1. A dynamic projection system suitable for an automobile, comprising:
    a light source, a collimating lens, a first microlens array, an LCD projection source and a second microlens array,
    wherein the dynamic projection system further comprises a polarization grating used for separating P-polarized light and S-polarized light, and a wave plate array, and
    wherein the wave plate array comprises a plurality of ½ wave plates arranged at intervals,
    wherein the polarization grating is arranged in front of the first microlens array and the second microlens array,
    wherein the ½ wave plates and the LCD projection source are arranged between the first microlens array and the second microlens array, and the ½ wave plates are arranged in front of the LCD projection source to play a role in converting one of the P-polarized light and the S-polarized light into the other one of the P-polarized light and the S-polarized light; and
    wherein a conversion wave plate is further arranged between the polarization grating and the first microlens array.

2. The dynamic projection system suitable for an automobile according to claim 1, wherein the first microlens array and the second microlens array each comprise a plurality of sub-lenses, and the sub-lenses comprise one or more of plano-convex lenses, biconvex lenses and meniscus lenses.

3. A dynamic projection system suitable for an automobile, comprising
    a light source, a collimating lens, a first microlens array, an LCD projection source and a second microlens array,
    wherein the dynamic projection system further comprises a polarization grating used for separating P-polarized light and S-polarized light, a condensing lens and a wave plate array,
    wherein the wave plate array comprises a plurality of ½ wave plates arranged at intervals;
    wherein the polarization grating is arranged in front of the first microlens array and the second microlens array,
    wherein the ½ wave plates are arranged between the first microlens array and the second microlens array to play a role in converting one of the P-polarized light and the S-polarized light into the other one of the P-polarized light and the S-polarized light,
    wherein the LCD projection source and the condensing lens are sequentially arranged at the back of the second microlens array; and
    wherein a conversion wave plate is further arranged between the polarization grating and the first microlens array.

4. The dynamic projection system suitable for an automobile according to claim 3, wherein the first microlens array and the second microlens array each comprise a plurality of sub-lenses, and the sub-lenses comprise one or more of plano-convex lenses, biconvex lenses and meniscus lenses.

5. The dynamic projection system suitable for an automobile according to claim 3, wherein the condensing lens is a lens selected from the group consisting of a plano-convex lens, a biconvex lens and a meniscus lens.

* * * * *